United States Patent [19]
Kudō

[11] Patent Number: 5,583,992
[45] Date of Patent: Dec. 10, 1996

[54] COMPUTER NETWORK SYSTEM FOR DETECTING GLOBAL DEADLOCK

[75] Inventor: Norikiyo Kudō, Tokyo, Japan

[73] Assignee: Kabushiki Kaisha Toshiba, Kawasaki, Japan

[21] Appl. No.: 286,906

[22] Filed: Aug. 8, 1994

Related U.S. Application Data

[63] Continuation of Ser. No. 757,994, Sep. 12, 1991, abandoned.

[30] Foreign Application Priority Data

Sep. 14, 1990 [JP] Japan .................................. 2-242463

[51] Int. Cl.$^6$ .............................. G06F 13/42; G06F 9/46; H04Q 11/00
[52] U.S. Cl. ................... 395/200.03; 395/200.11; 395/200.14; 395/730; 364/281.5; 340/825.5
[58] Field of Search ..................... 395/800, 650, 395/725, 200.01, 200.03, 200.12, 200.13, 726, 728, 730, 858, 859, 860, 478, 484, 200.14, 200.11; 364/281.5; 340/825.01, 825.02, 825.03, 825.04, 826, 827, 825.5, 825.51

[56] References Cited

U.S. PATENT DOCUMENTS

| | | | |
|---|---|---|---|
| 4,189,771 | 2/1980 | Roever | 395/650 |
| 4,318,182 | 3/1982 | Bachman et al. | 395/650 |
| 4,403,285 | 9/1983 | Kikuchi | 395/650 |
| 4,494,193 | 1/1985 | Brahm et al. | 340/825.5 |
| 5,016,167 | 5/1991 | Nguyen et al. | 364/281.5 |
| 5,377,351 | 12/1994 | Kotera et al. | 364/650 |
| 5,459,871 | 10/1995 | Van Den Berg | 364/281.5 |

OTHER PUBLICATIONS

M. Singhal, "Deadlock Detection in Distributed Systems", IEEE Nov. 1989, Survey & Tutorial Series, pp. 37–48.

Schall, "Parallel Cycle Detection in Distributed Databases", Jun. 1990, pp. 555–566.

Woucik et al, "Sufficient Condition for a Communication Deadlock and Distributed Deadlock Detection", IEEE, Dec. 1989, pp. 1587–1595.

Datta et al, "Deadlock Detection in Distributed Systems", IEEE, Mar. 1990, pp. 131–136.

Primary Examiner—Larry D. Donaghue
Assistant Examiner—Mark H. Rinehart
Attorney, Agent, or Firm—Cushman, Darby & Cushman; IP Group of Pillsbury; Madison & Sutro LLP

[57] ABSTRACT

A computer network system has nodes each comprising a control section, which detects whether or not a pseudo closed path having a contact to another node at either end is formed within the self node, and requests another node to check if the pseudo closed path is present when formation of the pseudo closed path is detected. Upon reception of a check request from another node, this control section determines whether or not the received check request is what has been issued by and returned to the self node, and determines that a global deadlock has occurred when the received check request is the one issued by and having returned to the self node. Otherwise, the control section checks if a pseudo closed path is present in the self node, and transfer a check request to another node if the check is affirmative.

7 Claims, 9 Drawing Sheets

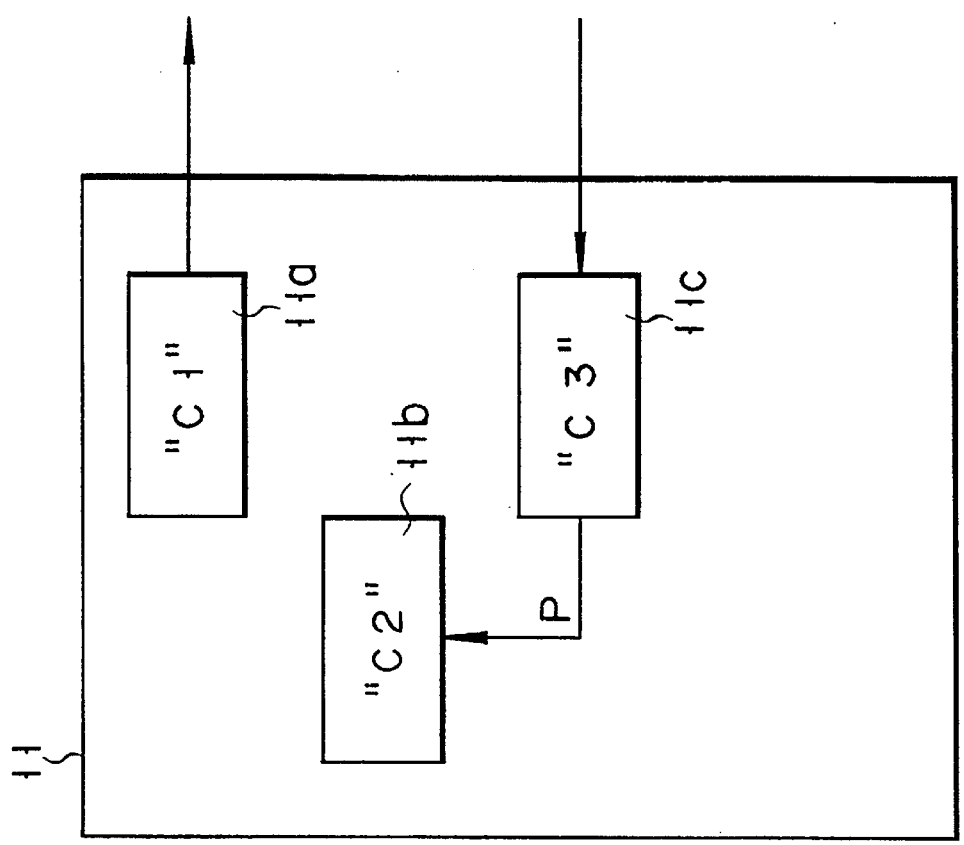

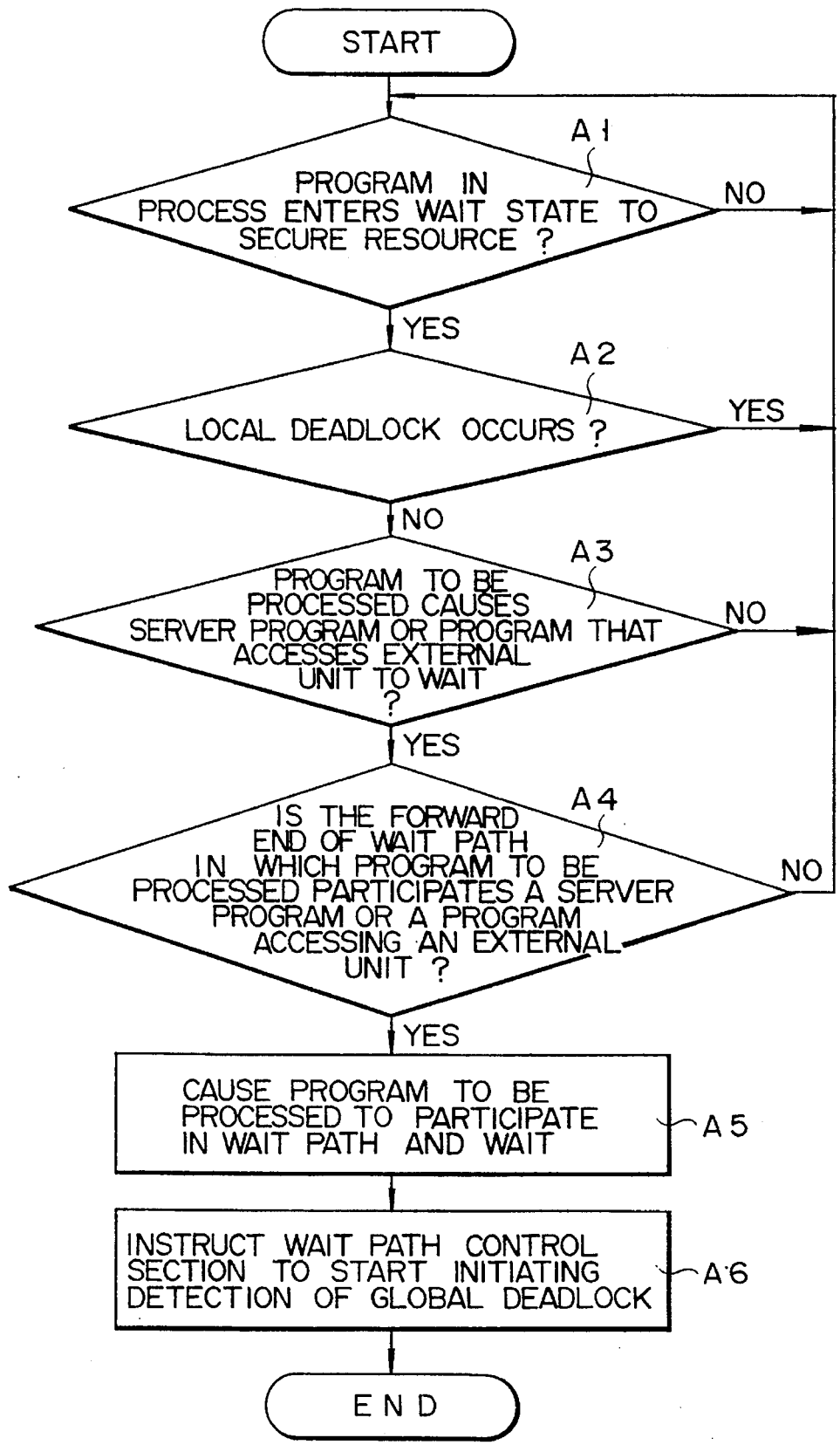
F I G. 9

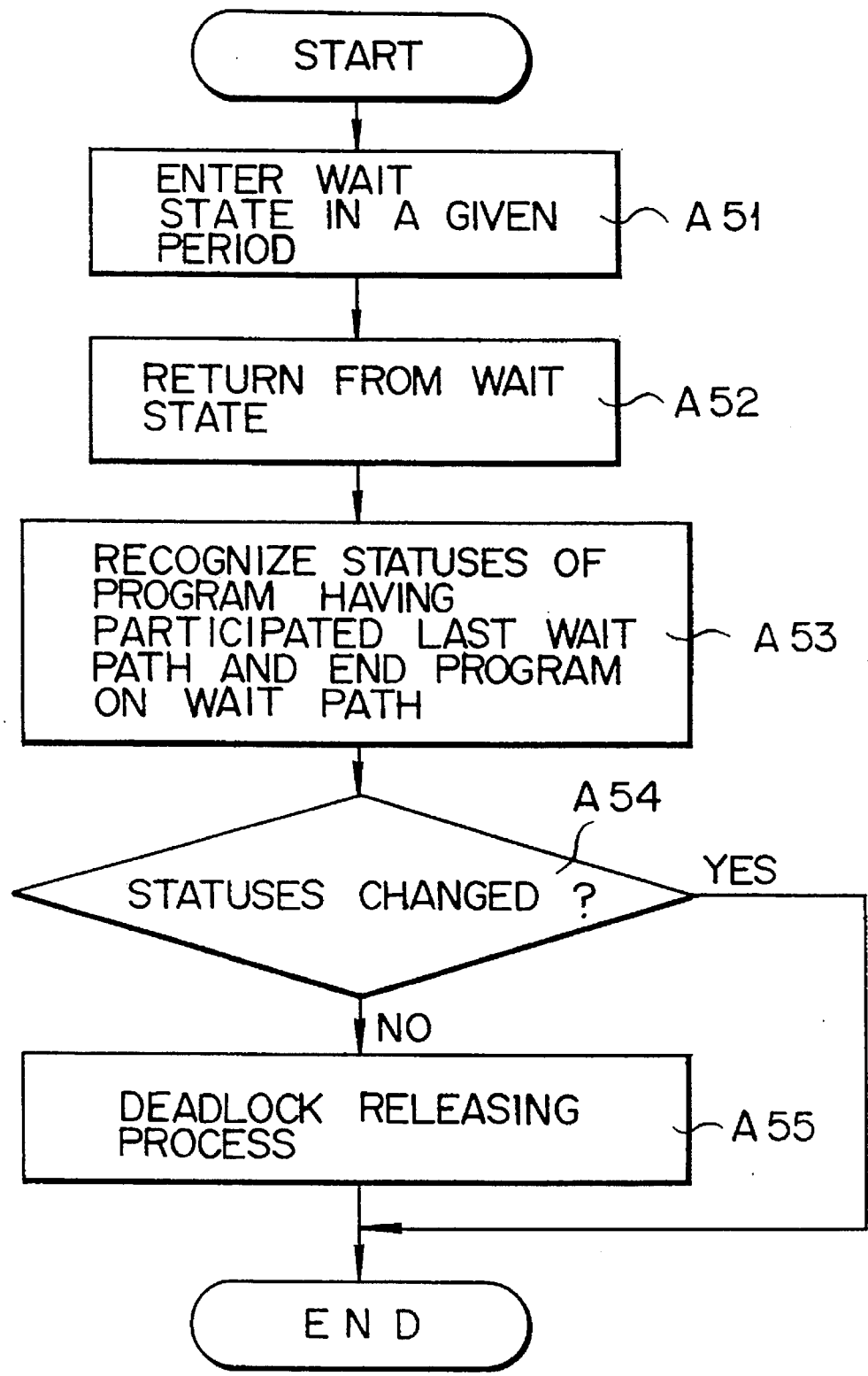
F I G. 15

COMPUTER NETWORK SYSTEM FOR DETECTING GLOBAL DEADLOCK

This is a continuation of application Ser. No. 07/757,994, filed on Sep. 12, 1991, which was abandoned upon the filing hereof.

BACKGROUND OF THE INVENTION

1. Field of the Invention

The present invention relates to a computer network system, and more particularly pertains to the art of detecting a deadlock over multiple nodes and releasing it.

2. Description of the Related Art

In a network system there is a possibility that a global deadlock and a local deadlock occur. A "global deadlock" is a situation where a plurality of programs running on multiple computer systems (nodes) each wait for one of the other programs to be released from a wait state and in such a way that none of the programs come out of the wait state. A "local deadlock" is a situation where multiple programs running on a single computer system each wait for another's release from wait state and cannot come out of the wait state.

The following are three conventional ways to detect a global deadlock:

(i) Distributed type: Detects a global deadlock using local deadlock detection information for each computer system.

(ii) Copied type: Individual computer systems have the same deadlock detection information and separately detect a global deadlock.

(iii) Centralized type: One of multiple computer systems detects the occurrence of a deadlock.

The distributed deadlock detection method is the best from the view point of reduction of overhead and the amount of information about deadlock detection. The disadvantage of the distributed method, however, is that it is difficult to insure the consistency of the deadlock detection information of multiple computer systems, and it is therefore difficult to accurately detect the occurrence of a deadlock.

There are network systems which link computer systems of different types. In such network systems each computer system monitors the time difference between the making a request to another computer system and the returning of a response therefrom. Each computer system determines that a deadlock has occurred when the target computer system does not respond within a given period of time. The disadvantage of deadlock detection method is that the detection accuracy depends greatly on the length of the monitoring time.

Various ways to detect deadlocks are described in Mukesh Singhal, *Deadlock Detection in Distributed Systems*, in IEEE Computer, November 1989, PP 37–48. The contents of this article are incorporated in this specification as a reference.

SUMMARY OF THE INVENTION

It is therefore an object of the present invention to provide a computer network system capable of accurately detecting a global deadlock.

To achieve this object, according to one aspect of the present invention, a computer network system has nodes linked together. Each node comprises: a "pseudo; closed path" detecting means, for detecting whether or not a path having a contact to another node at both ends is formed within the self node; check request means for requesting that another node located on one end of the pseudo closed path check if a pseudo closed path is present; transfer means for checking if a pseudo closed path has been formed; and reentrant determining means for, in response to a check request received from another node, determining whether or not the received check request is what has been issued by and returned to the receiving node, and for determining that a global deadlock has occurred when the received check request is the one issued by the receiving node.

According to the second embodiment of the present invention, a computer network system has linked multiple computer systems serving as data processing nodes, at least one of the nodes comprising time monitoring means for monitoring a time from a point of making a request to another node to a point of reception of a response from the another node. A pseudo closed path detecting means detects if a pseudo closed path is formed within the self node when the time monitoring means detects no response from the another node within a predetermined period of time. Finally, the second embodiment contains a means for recognizing that a global deadlock is occurring when the pseudo closed path detecting means has detected formation of the pseudo closed path.

According to the third embodiment of the present invention, a computer network system has linked multiple computer systems serving as data processing nodes, at least one of the nodes comprising pseudo closed path detecting means for detecting if a pseudo closed path is formed within the node, itself. A status change detecting means detects if the status of the pseudo closed path has changed upon elapse of a given period of time from a point of time when the pseudo closed path detecting means has detected formation of the pseudo closed paths. Finally, the second embodiment contains a means for recognizing that a global deadlock is occurring when the status change detecting means has detected no status change of the pseudo closed path.

The above-described arrangements can ensure stable and accurate detection of a global deadlock in a network that has computer systems of different types linked together.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram for explaining the operation of the external path counter which shows one node of a computer network system;

FIG. 8 is a diagram for explaining the operation of the external path counter which shows a representation of external path counters;

FIG. 9 is a flowchart for explaining an operation to detect a deadlock in the computer network system shown in FIG. 1 which shows the operation of making a request for detecting global deadlock;

FIG. 15 is a flowchart for explaining an operation to detect a deadlock in the computer network system shown in FIG. 13.

DETAILED DESCRIPTION OF THE PREFERRED EMBODIMENTS

Preferred embodiments of the present invention will now be described referring to the accompanying drawings.

Figure 1:
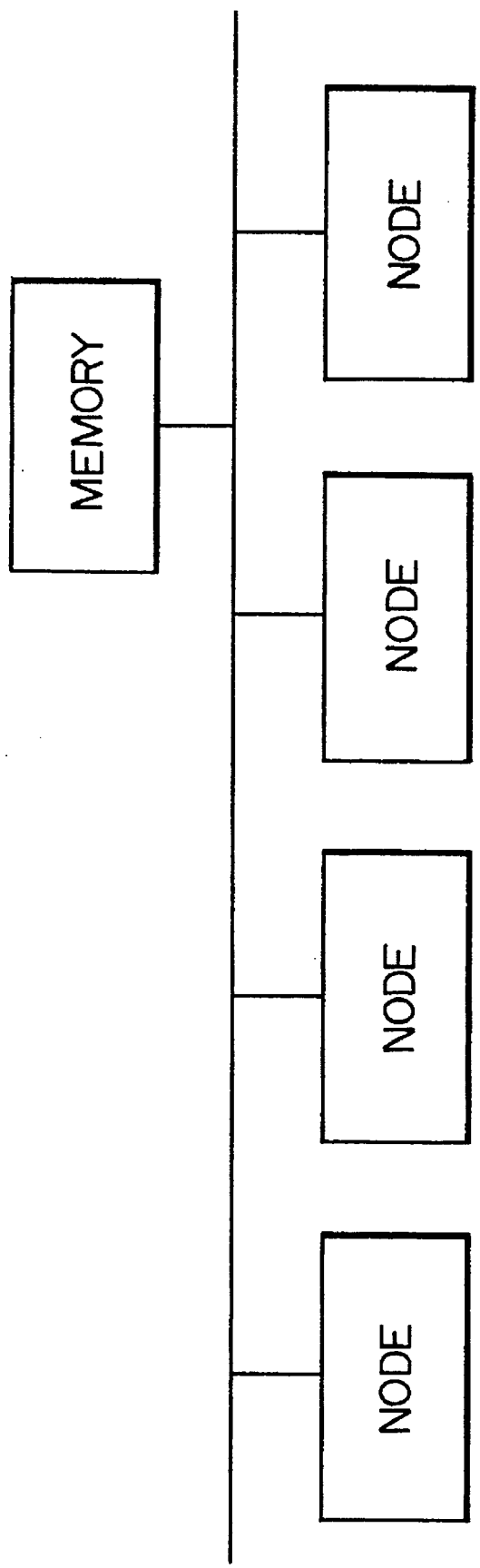
FIG. 1 is a block diagram illustrating a computer network system having nodes linked together according to the first embodiment of the present.

FIG. 1 illustrates a bus-type LAN as an example of a computer network system according to the first embodiment of the present invention. It is to be noted that this invention is not limited to the bus-type LAN, but is applicable to various other network systems, such as a ring type and a star type. Referring to FIG. 1, each data processing node is coupled to other multiple data processing nodes via a bus. Each data processing node in FIG. 1 comprises a computer system, a work station, a personal computer, and the like. To the bus is also connected a common memory, such as a RAM, a ROM or a hard disk which the computer systems utilize.

Figures 2, 3, 4:
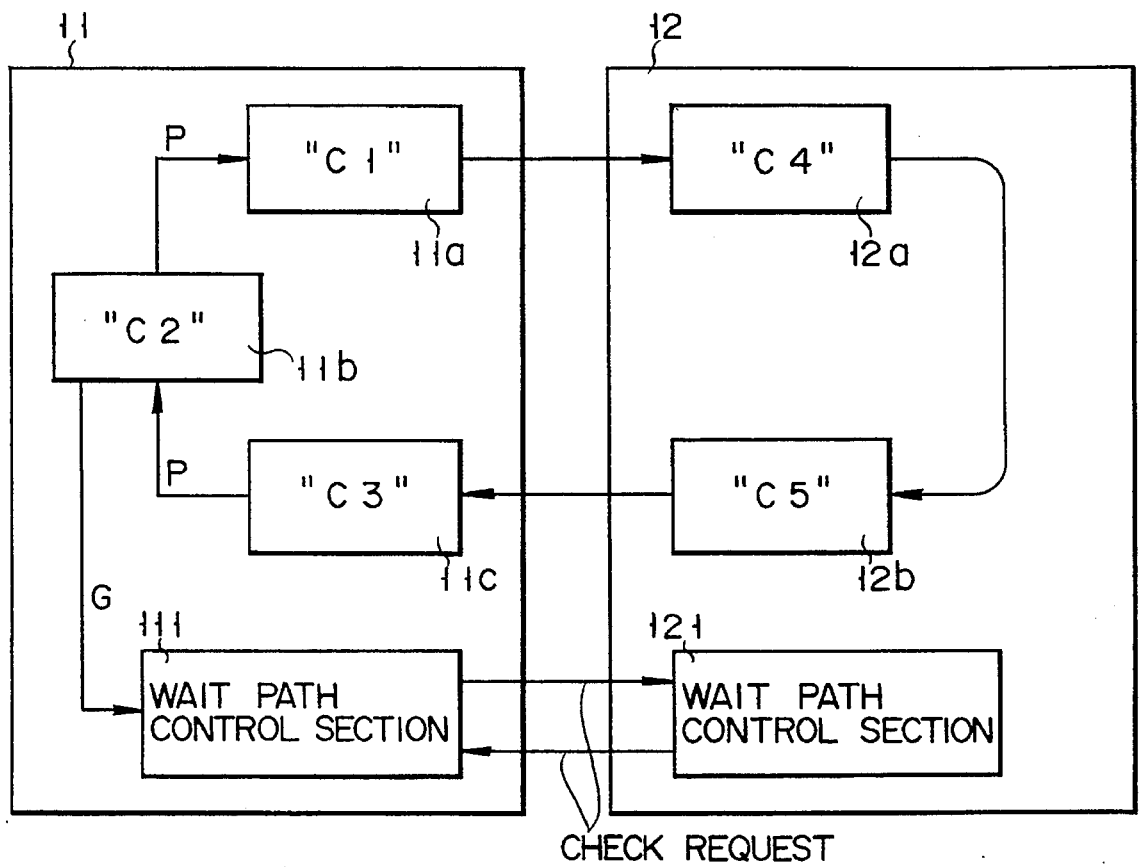
FIG. 2 is a block diagram illustrating two nodes of a computer network system according to the first embodiment of the present.
FIG. 3 is a diagram exemplifying a control table provided in the computer network system shown in FIG. 1.
FIG. 4 is a diagram exemplifying an external path counter table provided in the computer network system shown in FIG. 1.

FIG. 2 illustrates two nodes extracted from the network system shown in FIG. 1.

Referring to FIG. 2, reference numerals "11" and "12" denote computer systems which serve as data processing nodes of the computer network system. In FIG. 2 physical connection lines are omitted and the arrows connecting modules indicate a wait path P and a message path G which will be described later.

Program running modules (hereinafter referred to simply as "modules") 11a, 11b and 11c respectively execute programs (or tasks) C1, C2 and C3. Each module 11a, 11b or 11c exclusively obtains the right to use a resource and outputs a request to use other resources while keeping the right to use the former resource. It is known that resources include, for example, memory and files.

The wait path P, which represents an exemplary wait state between programs, is acquired by deadlock detection information of a control table (see FIG. 3) that is set in a node 11. In FIGS. 2 and 3, the module 11a (more specifically, the program C1 executed by the module 11a) is in a wait state and is waiting for the resource the module 11b (more specifically, the program C2 executed by the module 11b) is holding, while the module 11b is in a wait state and is waiting for the resource (program C3 executed by the module 11c) the module 11c is holding.

A wait path control section (hereinafter referred to simply as "control section") 111 comprises an operating system (OS) or hardware. This control section 111 refers to the control table (which will be discussed later referring to FIG. 3) to recognize the wait relationship between multiple modules in the node 11. In the example illustrated in FIGS. 2 and 3, the control section 111 recognizes the wait relationship between the modules 11a, 11b and 11c.

The control section 111 refers to an external path counter table (which will be discussed later referring to FIG. 4) to detect the formation of a pseudo closed path in the node 11. A "pseudo closed path" is a sequence of wait paths both ends of which go from or to another node. The simplest example of a pseudo closed path is a wait path sequence which starts with a wait path from another node and ends with a wait path to another node. For instance, in the node 11 in FIG. 2, a request from another node 12 enters the module 11c, a wait path sequence is formed between the modules 11c, 11b and 11a (more specifically, the programs C3, C2 and C1), and a request to the node 12 is output from the module 11a. In the node 11 in FIG. 2, therefore, a pseudo closed path is formed.

The control section 111 also requests another node (e.g., another node located in the forward direction) to check for the formation of a wait path. Upon reception of a request from another node to check for a wait path, the control section 111 checks if the received request is the same request which it had initiated earlier. If the received request is not of the above type, the control section 111 determines whether or not a pseudo closed path is formed. In accordance with the checking results, the control section 111 transfers the request to another node.

A message G is issued by a module which has just formed a wait path to inform the control section 111 of that module's entering a wait state. In FIG. 2, the module 11b which forms a wait path 11c–11b issues the message G to the control section 111 when it enters the wait state.

The node 12 is designed like the node 11. In the node 12, reference numeral "12a" denotes a module that runs a program C4, and reference numeral "12b" denotes a module that runs a program C5. A control section 121 performs an operation similar to that executed by the control section 111.

Although only the modules 11a to 11c, 12a and 12b are illustrated in FIG. 2 for the purpose of description, other modules would exist.

With the arrangement shown in FIG. 2, the module 12a serves as a server program to the module 11a that is making a request, while the module 11c serves as a server program to the module 12b that is making a request. The requesting program and the server program together are called a "program connected to another node."

FIG. 3 shows an example of a control table which manages the wait relationship between programs (or tasks).

The control table is held in the control section in each node. FIG. 3 shows that the module 11a holds a resource R1, the module 11b waits for the resource R1 being released, the module 11b holds a resource R2, the module 11c waits for the resource R2, and the module 11c holds a resource R3.

FIG. 4 shows an external path counter table which manages information indicating whether or not a "pseudo closed path" is formed. A "pseudo closed path", as mentioned earlier, is a sequence of wait paths both ends of which are coupled to another node. The external path counters are provided in one-to-one association with the modules in the control section of each node.

An initial value of "0" is initially set in each external path counter. When a program having a contact to another node is executed, a predetermined value ("1" in this example) is set in the associated external path counter. When one program waits for another program, the value of the external path counter of the program that waits is added to the value of the external path counter of the program that causes the wait.

The operation of the external path counters will be described briefly referring to FIGS. 5 through 8.

Figures 5, 6:
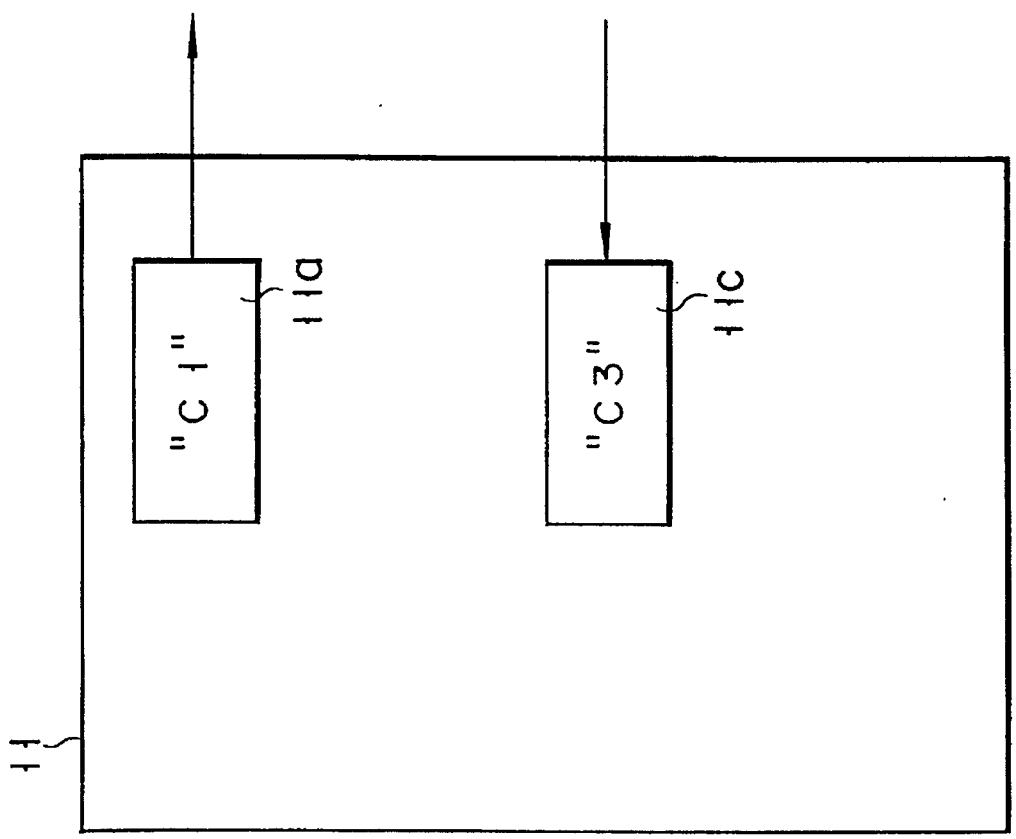
FIG. 5 is a diagram for explaining the operation of the external path counter which shows one node of a computer network system.
FIG. 6 is a diagram for explaining the operation of the external path counter which shows a representation of external path counters.

As shown in FIG. 5, when the program C1 that accesses another node is executed or the server program C3 for serving another node is executed, the control section 111 sets a predetermined value "1" to the associated external path counter as shown in FIG. 6. Further, when the program C3 waits for the program C2, the control section 111 adds the value of the external path counter of the program C3, "1," to the value of the external path counter of the program C2 causing a wait, "0," and sets the resulting value of "1" to the latter counter. Finally, when the program C2 waits for the program C1 as shown in FIG. 2, the control section 111 adds the value of the external path counter of the program C2, "1," to the value of the external path counter of the program C1 causing a wait, "1," setting the value of "2" to the latter counter as shown in FIG. 4.

In the case where the external path counter of a program holding a resource has a value other than "0," at least one end of a wait path tree (a group of wait paths at the top of which a program to be processed is located) includes a program which is connected to another node.

Whether or not the other end of the wait path is connected to another node can be recognized by detecting whether the wait path in which the current program to be processed will participate has its forward end connected to another node.

The operation of the computer network system in FIG. 2 that detects a global deadlock will now be described referring to FIGS. 9 through 14.

To begin with, the operation of making a request for detecting a global deadlock will be explained referring to FIG. 9.

A global deadlock occurs in the case where the sequential wait path which is formed by a program to be processed has arrows to and from other nodes at either end.

It will be first checked whether such a condition has occurred.

Based on information from the control table, the control section determines whether or not a program in process is in a wait state to secure a resource (step A1). For example, if the resource R1 should be granted to the program C2 in process and the program C1 is locked in the resource R1, it can be determined that the program C2 enters the wait state.

When the program in process enters the wait state, it is determined whether or not a local deadlock occurs in a node (step A2). If a local deadlock occurs, this deadlock should be released without detecting whether or not the global deadlock occurs. When the local deadlock occurs, therefore, the processes in the steps following step A2 will not be performed. When the local deadlock does not occur, the flow advances to step A3 to detect whether a global deadlock occurs. Since the local deadlock does not occur in the case shown in FIG. 2, the flow therefore goes to step A3.

In steps A3 and A4, it is detected if both ends of the wait path, which is formed by the program in process, have arrows from or to other nodes. For this detection, the control section determines in step A3 if the target program causes the server program or the program accessing an external node to wait. Whether the program in process causes the server program or the program accessing the external node to wait is determined by detecting if the external path counter of the program in process has a value of "0." In FIG. 4, the external path counter of the program C2 in process has a value of "1." The program in FIG. 2 therefore makes the server program or the client program wait.

When it is determined that the program in process causes the server program or the client program to wait, the flow moves to step A4. It is detected in step A4 if one end of the wait path which is formed by the target program has an arrow to or from another node. Specifically, the control section 111 determines whether the forward end of the wait path, which the target program participates in, indicates the server program or the program accessing an external section. In FIG. 2, the forward end of the wait path is the program C1 which is currently accessing an external section. It is therefore determined that the wait path which is to be formed by the program C2 in process has an arrow to another node.

If it is detected that both ends of the wait path, which is formed by the program in process, are connected to other nodes, the program in process participates in the wait path to be set to the wait state (step A5). When execution of the program in process is completed, this program informs the control section 111 of the message G that the program enters the wait state. The control section 111 instructs that a process of detecting a global deadlock should be started (step A6). In FIG. 2, when the program C2 enters the wait state, the program C2 sends the message G to the control section 111, which in turn instructs initiation of detection of a global deadlock.

In response to the message G, the control section holds a global identification (ID) number and access sequence number indicating accessed contents of the end program on the pseudo closed path, and a local ID number of the program which has participated last in the pseudo closed path. The local ID number is used to determine a program which forcibly releases the wait state when the global deadlock is last detected.

The control section 111, which has received the message G, determines, using the last program participating in the pseudo closed path as key, whether or not the status of the last program participating in the pseudo closed path has changed since the issuance of the message G. If the status has changed, the processing is stopped. More precisely, the section 111 determines whether the status of the last program participating in the pseudo closed path and also that of the forward-direction end program have changed. The message G contains information which helps the section 111 to detect the statuses of these programs.

If the status has not changed, the control section sends the global ID number and access sequence number of the end program and a check request to the control section of another node having the end program connected thereto in the arrow direction through the bus in order to ask the other node to trace a wait path.

In FIG. 2, in response to the message G, the control section 111 holds the global ID number and access sequence number of the accessed contents of the end program C1 on the pseudo closed path, and the local ID number of the program C2. The control section 111 supplies the global ID number and access sequence number of the end program C1 and the check request to the control section 121 in the node 12.

Upon reception of the check request, the node starts checking whether a global deadlock has occurred. The tracing process to be executed in the node ("12" in FIG. 2) which receives the check request will now be described referring to the flowchart in FIG. 10.

The wait path in a single node can be traced by that node itself. The wait path running through multiple nodes, however, cannot be traced by one node. Multiple nodes should therefore cooperate together to trace the wait path. After one node requests another node to trace the wait path, the state of the wait path in the former node may change, for example, due to the disappearance of the pseudo closed path. It is meaningless in this case to permit another node to trace the path. It is therefore necessary to assure the consistency of the recognition of the deadlock state between multiple nodes. This embodiment, therefore, adopts the principle that if the status of a program forming a wait path does not change, a program lower than that program in the wait path remains in the wait state. In other words, if it is granted that the status of the server program does not change since the issuance of the tracing request, it is ensured that the wait path in the preceding node has not changed. Information to be used for ensuring this is the "global ID number and access sequence number of the end program," which are affixed to the check request to be sent from the preceding node.

The global ID number of the end program is an identifier to be assigned to each program so that the number can be inherent when activated as a job. The same identifier is assigned to programs with a client-server relationship. The start of the wait path in the node which received the check request can be recognized by the global ID number. In other words, it is possible to detect if a contact program disappears before the check request is sent to another node.

The access sequence number of the end program is an identifier which is assigned to the program so that the number becomes specific in the network whenever the client program sends a request to the server program.

Figure 10:
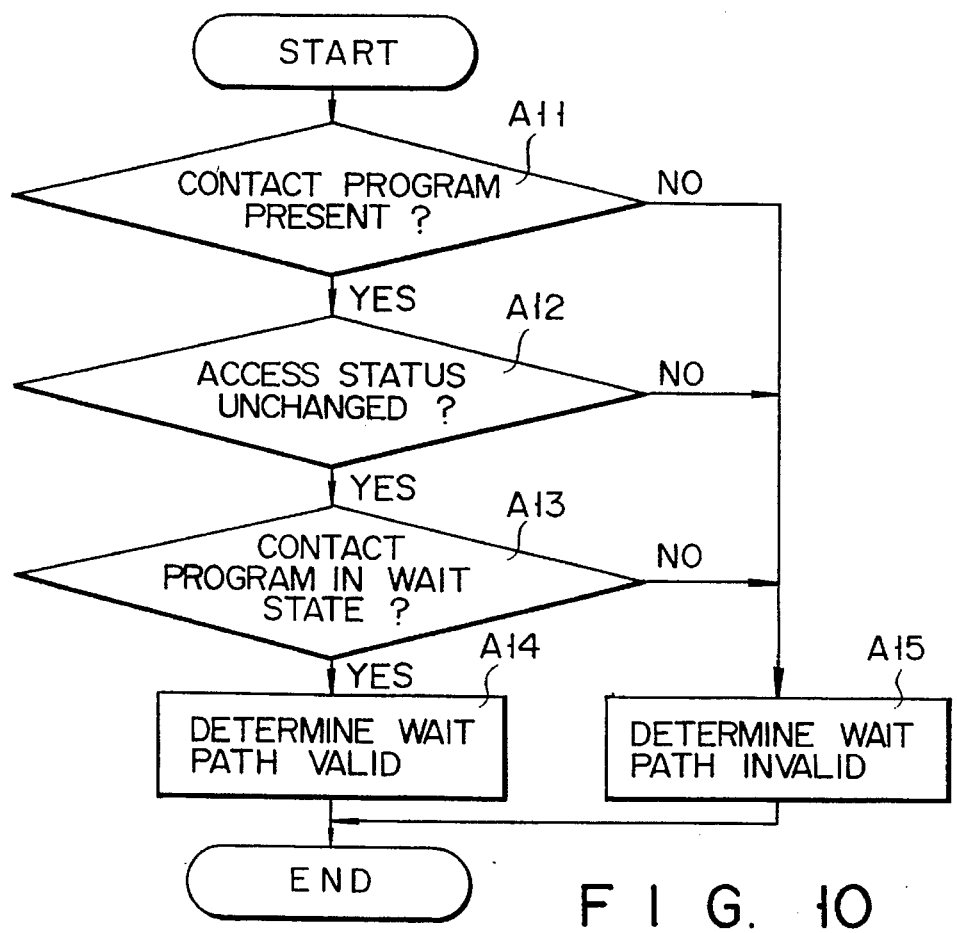
FIG. 10 is a flowchart for explaining an operation to detect a deadlock in the computer network system shown in FIG. 1 which shows processing in the node which receives the check request.

The flowchart in FIG. 10 will now be referred to. First, it is determined in step A11 whether or not a contact program is present. In other words, it is checked if a contact program is present, whose ID number is identical to the global number given to the check request. It is also checked in this step that the contact program has disappeared during, for example, the issuance, reception, or processing of the check request.

By comparing the access sequence number of the server program with that of the client number, it is confirmed in step A12 that there is no change in the status of the server program accessed when the check request is issued. For instance, it is also determined in this step if the server program has completed the processing necessary at the time the check request is issued during, for example, the issuance, reception and processing of the check request, and the server program is already waiting for the process for the next request while the server and client programs have the same ID number.

Then, it is determined in step A13 if the contact program is in the wait state. It is identified in this step that the contact program (upper program) is shifted from the wait state to the state of being in operation.

If the decisions in steps A11 to A13 are all affirmative, it is ensured that no change in status has occurred with respect to the wait path of the lower program. In other words, it is ensured that the wait path is valid, i.e., the consistency of the wait state in the nodes 11 and 12 is ensured (step A14). The flow thus moves to the routine shown in FIG. 11. If the decision in at least one step of steps A11 to A13 is negative, the wait path is determined as invalid (step A15) and the process is terminated. In FIG. 2, since the global number and access sequence number of the server program C4 coincide with those of the client program C1, and the contact program C4 is in the wait state, the decisions in steps A11 to A13 are all affirmative and the wait path is determined valid.

Figure 11:
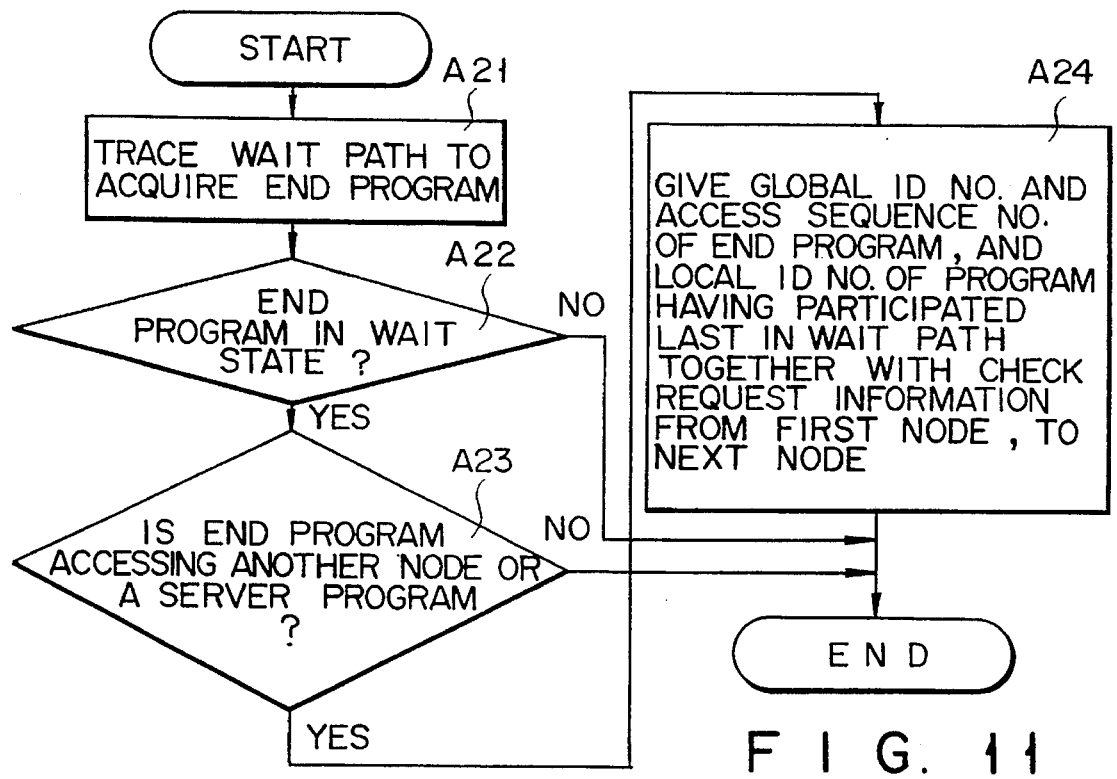
FIG. 11 is a flowchart for explaining an operation to detect a deadlock in the computer network system shown in FIG. 1 which shows further processing in the node which receives the check request.

After the consistency of the wait state is confirmed through the processing in FIG. 10, the flow advances to step A21 in FIG. 11. In step A21, the control section of the node which has received the check request traces the wait path to specify the end program.

It is checked whether the detected end program is in the wait state (step A22). When the end program is in the wait state, it is determined if the end program is the program accessing another node or the server program (step A23). In the case that the end program is in the wait state and it is either the server program or client program, the flow goes to step A24. In other cases, the process is terminated.

In step A24, the control section issues a check request, together with the global ID number and access sequence number of the end program, to the succeeding node. The check request includes information from the node that has originally issued the check request.

In FIG. 2, the control section 121 has the end program C5 accessing to the other node 12 in the wait state. The control section 121 therefore issues the check request to the succeeding node 12. Affixed to the check request are the global ID number and access sequence number of the end program C5, and information from the node 11 which has originally issued the check request (global ID number and access sequence number of the program C1, and the local ID number of the program C2 which has last participated in the wait path).

Figure 12:
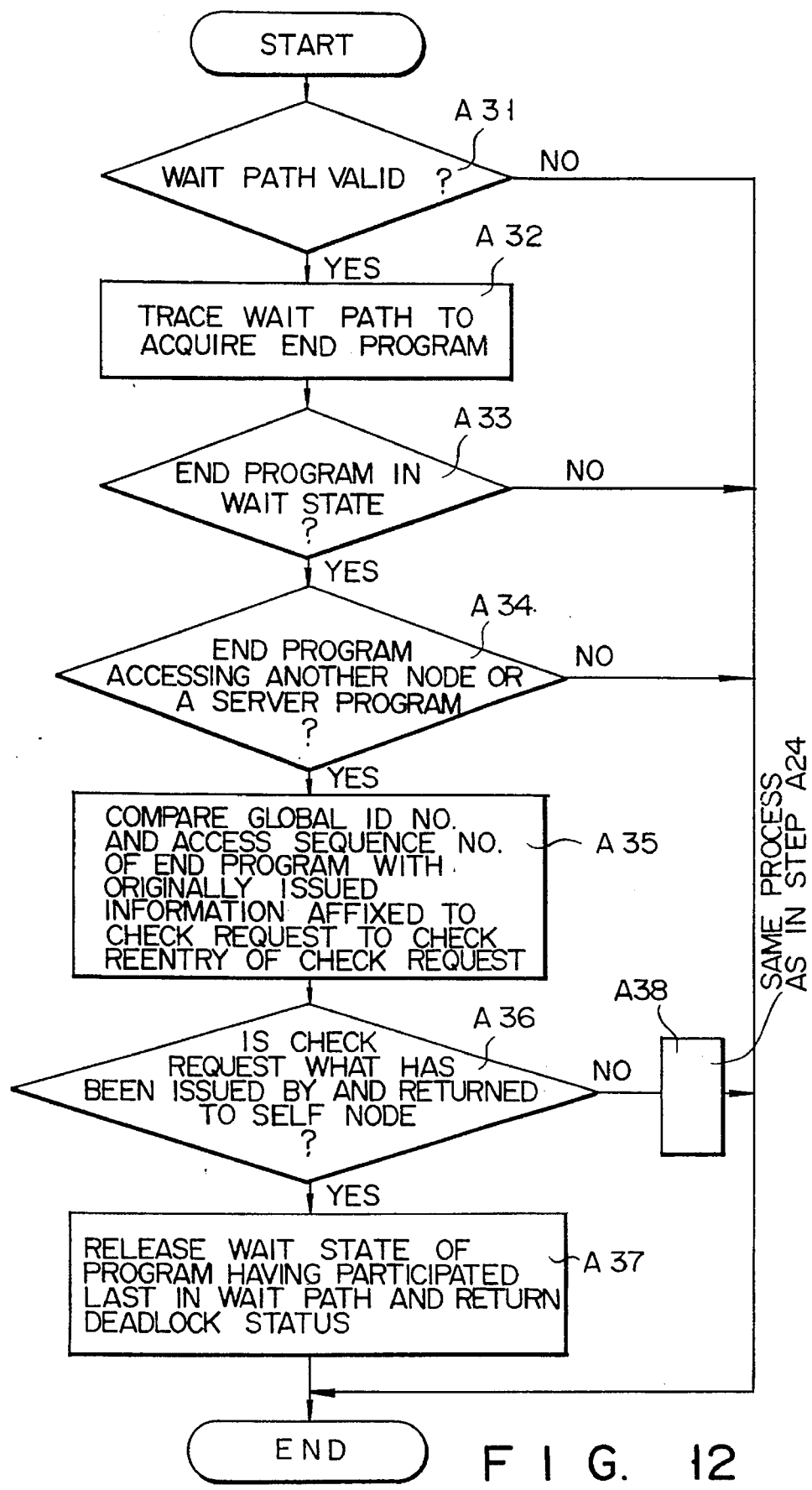
FIG. 12 is a flowchart for explaining an operation to detect a deadlock in the computer network system shown in FIG. 1 which shows the process of detecting the reentry of a check request.

The process of detecting the reentry of a check request in the node 11 will now be explained referring to FIG. 12.

There are cases where a request for checking and tracing the wait path one node after another is returned to the node that has originally issued the request.

There are two possible cases:

(i) The check request returns to the original node when passing through the wait path.

(ii) The wait path check request that one node requests returns to that node that is located at the end of the wait path.

The ID number and access sequence number of the end program in the node which has originally issued the request are sent together with the check request to another node. Which case is the cause for the returning of the check request can be determined as the request-receiving node compares the received data with those of that node. When the comparison results in data coincidence, the wait path control section recognizes that the wait path is looped and detects that a global deadlock has occurred.

The specific explanation of the detection of the reentry of a check request will be given referring to FIG. 12. It is determined if the wait path is valid in the same manner as in the process for keeping the consistency of a deadlock in FIG. 10 (step A31). Then, it is checked if the pseudo closed path remains in the node (step A32 to step A34). Further, it is detected whether the check request originally issued by the self node has returned (steps A35 and A36).

In this request return detecting process, the ID number and access sequence number of the end program of the node which has originally issued the check request, both numbers sent together with the check request, are compared with the ID number and access sequence number of the end program, which have been held at the time of issuance of the check request. If there is a data coincidence, it means that a global deadlock has occurred so that the check request issued by the self node has returned thereto. The flow therefore advances to step A37. The control section in the node forcibly releases the wait state of a so-called "victim program," or a program which has participated last in the pseudo closed path of the node. Then, the deadlock status is rendered to the victim program.

If the check request issued by the self node is not returned, it means that the check request goes back to the node which has issued the check request while passing through the wait path. Step A38 corresponding to step A24 in FIG. 11 is performed so that the check request is transferred to the following node.

In FIG. 2, if the check request is again sent to the check-request issuing node 11, the wait path is valid and the pseudo closed path remains in the node 11. The processes in steps A35 and A36 are performed, accordingly. In the processes, the ID number and access sequence number of the end program C1 of the original check-request issuing node, both numbers transferred together with the check request from the node 12, are compared with the ID number and access sequence number of the end program C1, which have been held at the time of the issuance of the check request. When the comparison results in data coincidence, it is determined that a global deadlock has occurred. The control section 111 releases the holding state of the resource R2 which the program C2 occupies, and returns a deadlock status to the program C2.

In the first embodiment of the present invention as described above, when a pseudo closed path directed from a program (module/task/job) having a contact to another node to another program (module/task/job) also having a contact to another node is formed, a check request is issued to other nodes to check whether or not the pseudo closed path is formed. If a global deadlock has occurred, therefore, the check request is at last returned to the node which has originally issued the request. Accordingly, it is possible to detect the occurrence of the global deadlock.

In response to the check request, it is checked whether the pseudo closed path is formed, under the condition that the status of the pseudo closed path on the check-request issuing side is unchanged. A global deadlock can accurately be detected while the consistency of the deadlock information is kept between the nodes.

Figure 13:
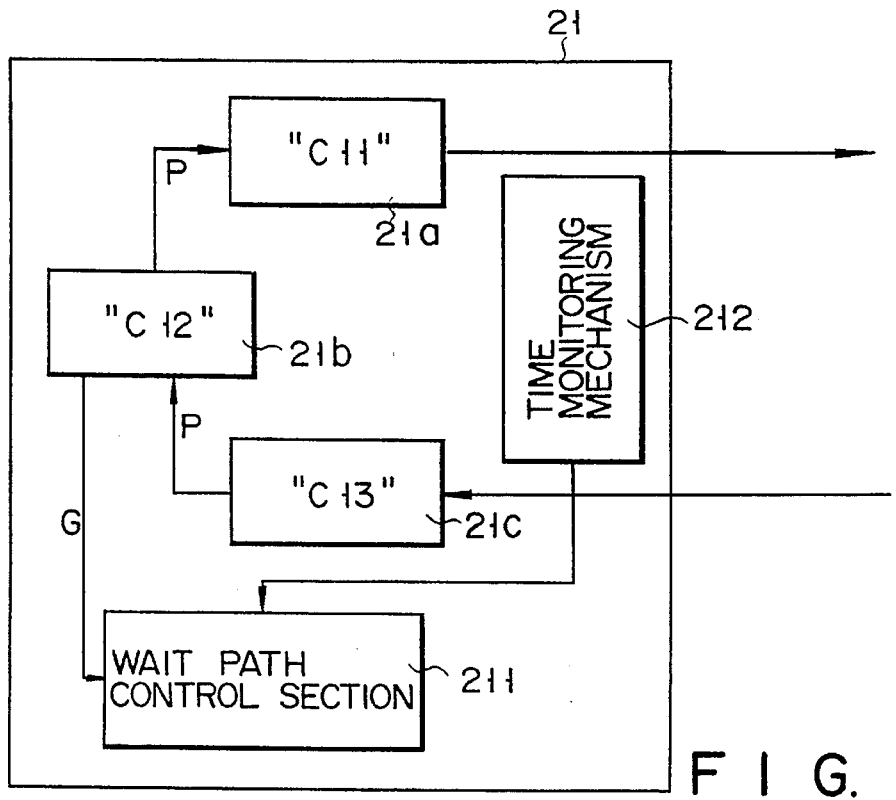
FIG. 13 is a block diagram of a computer network system according to the second embodiment.

The computer network according to the second embodiment of the present invention will now be described referring to FIG. 13. Illustrated in FIG. 13 is a computer system 21 constituting one node in the computer network system.

The node 21 is connected to the node of a different model through networks. In the node 21, program running modules 21a, 21b and 21c respectively execute programs C11, C12 and C13. Each module 21a, 21b or 21c exclusively obtains the right to use a resource, and outputs a request to use other resources while keeping the right to use the former resource.

The wait path P represents a wait state between programs which is acquired by deadlock detection information of a control table, the same as shown in FIG. 3, that is set in a node 21. In FIG. 13, the module 21b is in a wait state to the resource the module 21a is holding, while the module 21c is in a wait state to the resource the module 21b is holding.

A wait path control section 211 recognizes the wait states of modules 21a, 21b and 21c according to the control table, and detects that a pseudo closed path is formed in the node 21, using the same external path counter table shown in FIG. 4. The control section 211 is interlocked and controlled with a time monitoring mechanism 212 monitoring the time.

A message G is issued from the last module (module 21b in this case) which participates in a wait path P, reporting the entrance to the wait state.

The time monitoring mechanism 212 monitors the period of time after the node 21 sends an access request to another node until the node 21 receives a response therefrom.

The operation of the system, shown in FIG. 13, that detects a global deadlock will be described referring to the flowchart in FIG. 14.

There are two possible cases where a deadlock occurs in a computer network system to which nodes of different types are connected.

The first case is the occurrence of a deadlock (pseudo deadlock) due to a data access to another node waiting. The second case is the occurrence of a global deadlock which originates from a local wait in the node with the resource of another node locked.

The detection of the first deadlock will now be explained.

A request is sent to access data to another node as per the prior art. If a response to the request is not returned within a given period of time, a mode for forcibly issuing a completion message is set. Thereby, the request to access data to the other node is cancelled. In this stage, the resources locked to the program C11 are not released. This can release a lock state caused by no response received from the destination node. Further in this embodiment, at the time of the forcible release, it is checked whether the server program or a program having accessed another node is present at a start point of wait paths at the top of which a program which was subjected to the forcible release is located. In the case where a program which satisfies the condition is present at the start point, that is, the pseudo closed path exists, it may be determined that the node having that program causes a program in another node to wait while it is also kept waiting by the resource of another node. In order words, this node can be considered to cause part of a global deadlock.

Figure 14:
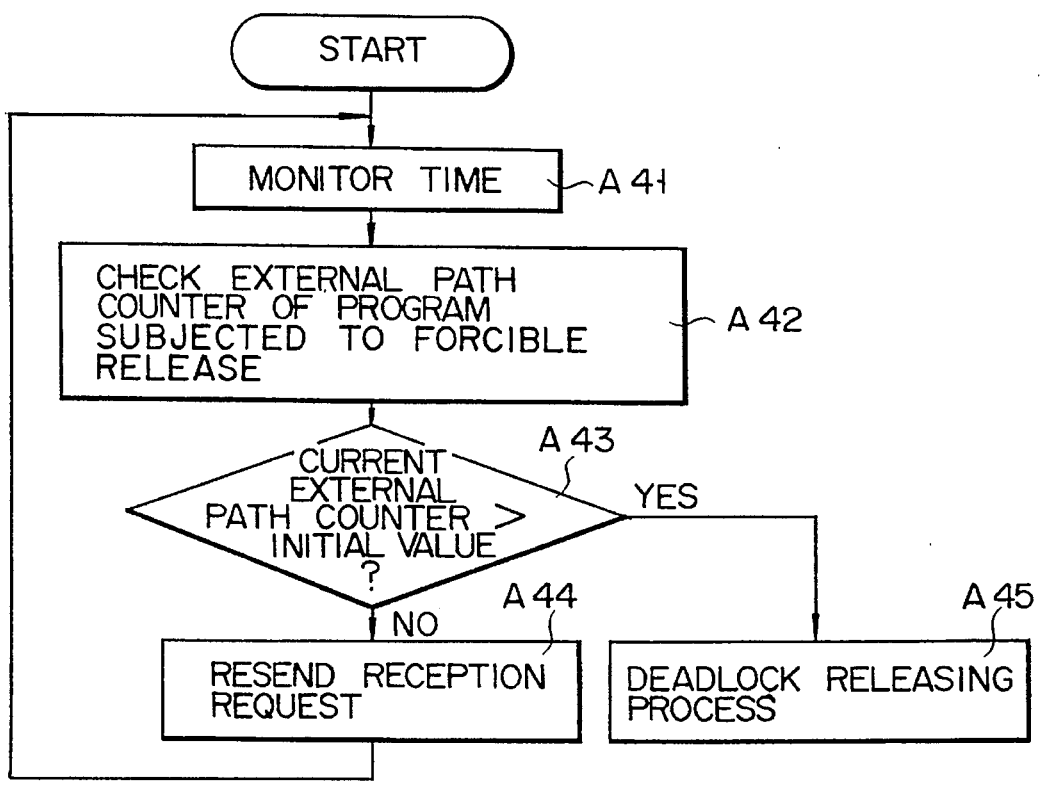
FIG. 14 is a flowchart for explaining an operation to detect a deadlock in the computer network system shown in FIG. 13.

The above determination process will be specifically explained referring to the flowchart in FIG. 14.

The time monitoring mechanism 212 monitors the time from the point of the issuance of an access request to the returning of a response to the request (step A41). If any response is not returned within a predetermined monitoring time, the time monitoring mechanism 212 sends, for example, an interrupt signal to the control section 211. The control section 211 then determines if the pseudo closed path is formed in the node 21, by checking the external path counter of the program which was subjected to the forcible release (program C11 in this case) (steps A42 and A43).

More specific explanation of the process will be given. The external path counters are provided in one-to-one association with the individual modules, as explained in the description of the first embodiment. A value "1" is set with respect to a program contacting another node. The value of the external path counter of that program which is ready to wait is added to the value of the external path counter of that program which causes the former program to wait. If the external path counter of the program which was subjected to the forcible release has the value "1," the pseudo closed path has not been formed yet. That is, the global deadlock does not occur. If the external path counter of that program has any value more than the value "1", the pseudo closed path exists and there is possibility that the global deadlock occurs.

When the external path counter of the program C11 which was subjected to the forcible release has the value "1," therefore, the control section 211 controls the module 21a and forces it to resend a reception request (step A44). When that counter of the program C11 has a value other than the value "1," the control section 211 releases the deadlock state (step A45). Through this releasing process in step A45, the control section 211 forcibly releases the resources locked to the program which was subjected to the forcible release.

Detecting the second type deadlock, i.e., the deadlock caused by a local wait in the self node while the resource of another node is locked, will be described referring to FIG. 15.

The program C12 checks a corresponding external path counter when recognizing that the program C12 should wait with respect to the program C13 (the direction of the wait path is opposite to that in the first case). If the program C11 is in the wait state with respect to the program C12, the external path counter of the program C12 has any value other than "0." The program C12 therefore recognizes that the contact program to a external node is in the wait state.

As the wait path is traced further, it reaches to the end program C13. Since the value of the external path counter of the program C13 is other than "0" (because it is a server program), it is determined that the path has reached the program contacting the external section. That is, it is determined that the pseudo closed path will be formed.

If the program C12 enters the wait state under this condition, it is possible to cause a deadlock over the network.

Before the program C12 enters the wait state, the program C12 affixes information about the programs C13 and 12 to a check request, informing the control section 211 that it will enter the wait state.

When informed of the event, the control section 211 becomes ready to wait, and then enters the wait state for a given period of time while holding the information about the programs C13 and C12 (step A51).

The control section 211 returns from the wait state when, for example, the time monitoring mechanism 212 detects that a predetermined time has elapsed since the starting of the wait state (step A52). The control section 211 then recognizes the current statuses of the program C12, having participated last in the wait path, and the end program C13 on the wait path (the wait states or not, the access sequence numbers, etc.) (step A53). The control section 211 then compares the recognized statuses with the previous statuses reported by the message from the program C12. Further, the control section 211 determines if the statuses of the individual programs C12 and C13 have been changed (step A54).

When the statues have not been changed, the control section 211 recognizes the occurrence of the global deadlock, and executes a deadlock releasing process (step A55). During this process, the control section 211 forcibly releases the wait state of the victim program or the program C12 which has participated last in the wait path, in order to eliminate the wait path, returning the deadlock state to the program. When the status has been changed, the control section 211 terminates the process.

According to the second embodiment, detection of a deadlock state in the self node is added to the conventional step of determining the deadlock state only by the time monitoring process. It is therefore possible to ensure stable and accurate detection of a global deadlock in the network to which nodes of different types are connected.

According to the present invention as described above, a global deadlock can be detected correctly with stable accuracy.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system having nodes linked together, each one of said nodes comprising:

a plurality of modules accessible to each other;

first detecting means for detecting a formation of a pseudo closed path formed by at least some of said plurality of modules within said node, a pseudo closed path being a waiting path formed by some of said modules, either end of the path being linked to a module of a node of the computer system outside of said node itself;

check request means for sending to an adjacent node of said one node, in accordance with said first detecting means detecting the formation of the pseudo closed path at said one node, a check request for the adjacent node to check for existence of a pseudo closed path within the adjacent node itself, said request including an identification number and access sequence number of a module corresponding to a forward directional end of the pseudo closed path within the one node itself;

second detecting means for detecting, responsive to a request sent from another node in said computer system, formation of the pseudo closed path within the node linked to a pseudo closed path within the other node on the basis of an identification number and access sequence number included with the request sent from the other node;

transfer means for sending, in accordance with said second detecting means detecting the formation of the pseudo closed path, a request to an adjacent node to check for existence of a pseudo closed path within the adjacent node, the request including an identification number and access sequence number of a module corresponding to a forward directional end of the pseudo closed path within said one node itself and also with the identification number and access sequence number affixed to the request sent from said other node; and means for determining, responsive to a request sent from another node of said computer system, whether the request which has sent by said check request means is returned to said node itself and whether deadlock has occurred, said determining based on the identification number and access sequence affixed to the request which was sent by said check request means and on an identification number and access sequence affixed to the request sent from said another adjacent node.

2. A computer network system according to claim 1, wherein said first detecting means includes:

means for detecting a waiting state of the module corresponding to the forward directional end of the pseudo closed path within the node itself.

3. A computer network system according to claim 1, wherein the second detecting means includes:

means for detecting a waiting state of the module corresponding to the forward directional end of the pseudo closed path within the node itself.

4. A computer network system according to claim 1, wherein the second detecting means includes:

means for detecting a linkage between a module corresponding to a reverse directional end of the pseudo closed path within the node itself and a module corresponding to a forward directional end of the pseudo closed path within the another adjacent node.

5. A computer network system according to claim 1, wherein the second detecting means includes:

means for identifying the forward directional end of the pseudo closed path within the node itself by tracing on the pseudo closed path from an reverse directional end thereof.

6. A computer network system according to claim 1, wherein the determining means includes:

means for, responsive to a request sent from the another node, detecting the formation of the pseudo closed path within the node itself; and means for determining that the deadlock has occurred in the case where the pseudo closed path within the node itself is formed.

7. A computer network system according to claim 1, further comprising:

means for measuring a period of time from when the request is sent by the check request means to when the request is returned to the node itself;

means for detecting the formation of the pseudo closed path within the node itself when the request has not been returned to the node within a predetermined period of time; and means for determining that global deadlock has occurred in the case where the formation of the pseudo closed path within the node itself is detected by the detecting means.

\* \* \* \* \*